Oct. 2, 1945.                R. C. HUNTOON                 2,385,991
                              ANCHOR NUT
                       Original Filed Sept. 14, 1943
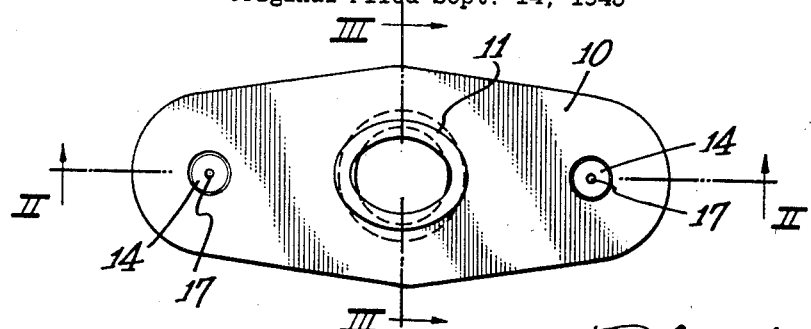
Fig. 1.
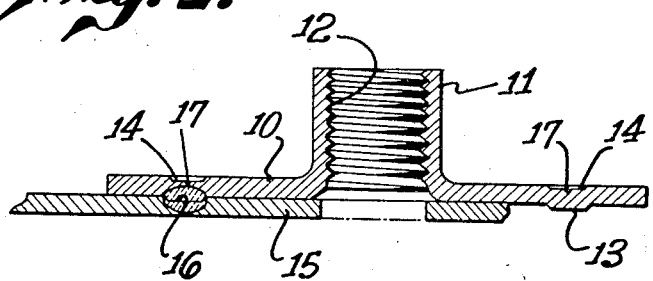
Fig. 2.
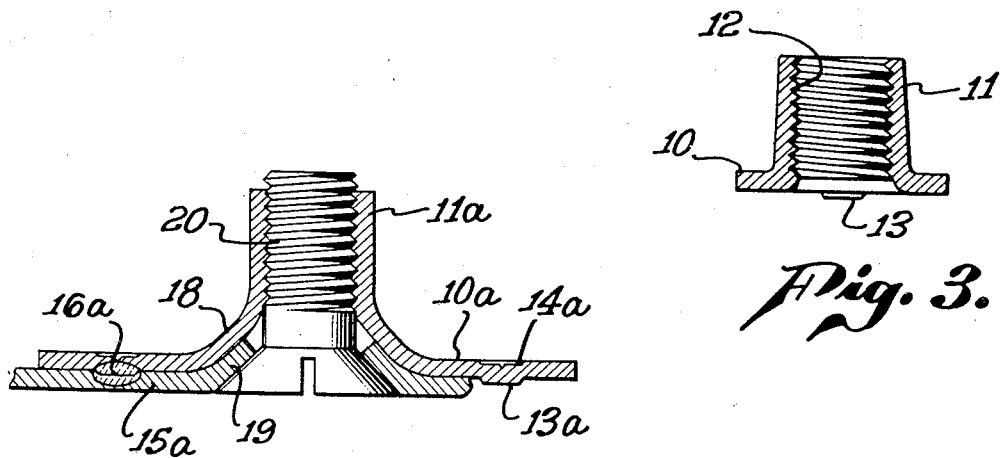
Fig. 3.
Fig. 4.
RUSSELL C. HUNTOON,
             INVENTOR.
BY E. Woodbury
             ATTORNEY.

Patented Oct. 2, 1945

2,385,991

UNITED STATES PATENT OFFICE 2,385,991

ANCHOR NUT

Russell C. Huntoon, San Diego, Calif., assignor to Solar Aircraft Company, a corporation of California Original application September 14, 1943, Serial No. 502,248. Divided and this application May 9, 1944, Serial No. 534,727

2 Claims. (Cl. 85—32)

This invention relates to nuts of the type that are permanently attached to the parts they support so that they remain in place irrespective of whether or not they are engaged by their associated screws.

This application is a division of a copending application Serial No. 502,248, filed September 14, 1943, by Russell C. Huntoon and Harry Wright, and entitled "Self-locking nut plate."

It is common to employ such nuts, or nut plates as they will hereinafter be referred to, in large quantities in aeroplane manufacture, and in such service the nut is usually provided with a thin base or flange that is spot welded to the surface of the member (usually a sheet metal part) on which the nut plate is mounted.

It is also desirable in many instances, and imperative in others, that the nut have self-locking characteristics so that its screw will not loosen in response to vibration.

An object of this invention is to provide a light weight, inexpensive, self-locking nut plate.

Another object is to provide a nut plate adapted to be spot welded to an associated part, which nut plate can be readily removed when necessary.

Another object is to provide a self-locking nut plate of inexpensive and simple construction such that its associated screw or screws can be inserted and removed repeatedly without destroying the self-locking action.

Still another object is to provide a self-locking nut plate that has little tendency to seize its associated screw even after being exposed to relatively intense heat.

Other more specific objects and features of the invention will become apparent from the detailed description to follow of certain preferred embodiments of the invention.

Briefly, the present invention comprises a sheet metal stamping having a base portion configured to lie against the object to which it is to be attached and having formed integrally therewith, as by a drawing operation, an upstanding threaded collar which is of circular cross section adjacent the plate but is flattened to an oval cross section at the outer end. The screw is started into the circular end and screwed far enough so that a portion thereof enters the oval section of the thread and deforms it as it does so. The material of which the nut is formed preferably has sufficient elasticity so that the spreading action of the screw in the oval section does not permanently deform it. Hence, the nut grips the screw with a force that is relatively uniform and does not change with use, the nut recovering its oval shape whenever the screw is removed.

Referring to the drawing:

Fig. 1 is a plan view of one embodiment of the invention;

Fig. 2 is a section along the line II—II of Fig. 1 showing a portion of the base to which the nut plate is attached;

Fig. 3 is a section along the line III—III of Fig. 1; and

Fig. 4 is a section similar to the section of Fig. 2 but showing a modified nut plate adapted for use with a countersunk screw.

Referring to the drawing, the nut plate shown in Figs. 1, 2 and 3 comprises a substantially flat base section 10 of elongated, roughly oval shape having an upstanding collar 11 located substantially at the middle thereof. The collar 11 is preferably formed from a portion of the base material by a drawing operation, the latter being preferably so performed as not to diminish the thickness of the metal in the collar.

After the collar has been drawn, it is internally threaded with a straight tap of such dimension that the threads 12 formed in the collar readily receive screws of corresponding size. In this connection, it should be noted that there is substantial variation in the diameters of different screws of the same rated size and the threads 12 should be large enough to readily receive the largest screws that might be used.

After the straight thread 12 is formed, the outer end portion of the collar 11 is compressed in one plane, in this instance the transverse plane as shown in Fig. 3, so that in this plane the threaded opening tapers from full diameter at the base end to a reduced diameter at the outer end. This flattening of the collar spreads it in the plane at right angles; thus, as shown in Fig. 2, the outer end of the threaded portion is larger than the inner portion. However, when a screw is driven into the nut, it spreads the nut in the plane shown in Fig. 3 and the nut is simultaneously contracted in the plane of Fig. 2 so that it becomes of substantially circular cross section throughout to snugly fit the screw.

It is intended that the nut plate will ordinarily be welded to a metal surface to which it will be secured, and it is convenient to attach the plates by a spot welding operation, two spots sufficing to hold a plate of the type shown on the drawing. To facilitate the spot welding operation, the material of the base is indented on the upper side at the time it is formed and forced outwardly slightly on the lower side to form two flat bosses 13 projecting slightly below the general surface of the plate. A corresponding flat depression 14 is formed on the upper side of the plate juxtaposed to the boss 13, which facilitates the centering of the welding electrodes during the spot welding operation. In Fig. 2 a completed spot weld between the nut plate and a sheet 15 to which the nut plate is attached is indicated at 16.

Occasionally, the nut plates have to be removed and the easiest way to remove them is to drill through the base of the plate at the location of the spots. To facilitate such a drilling operation, should it be required, drill-centering recesses 17 are formed within the recesses 14 during the forming operation. The diameter of the flat bosses 13 is such that the spotweld diameter is limited to a size which permits removal by a pre-determined drill size.

The modification shown in Figs. 1, 2 and 3 is adapted for use with screws that are not countersunk into a sheet to which the nut plate is attached. In many instances, the nut plate is used on sheet surfaces that are countersunk to receive the screw so that the head of the latter will be flush with the sheet. In such instances, the nut plate will be shaped as shown in Fig. 4 in which the collar 11a is connected to the base portion 10a by a gradually curved throat section 18 which receives a countersunk or dimpled portion 19 of the plate 15a to which the nut plate is attached. Fig. 4 shows a flat headed screw 20 fitted into the dimpled portion of the plate 15a and threaded into the collar 11a of the lock plate. In actual use, of course, the screw 20 would also pass through a dimpled hole in the sheet that is to be fastened to the sheet 15a, and would clamp the two sheets together.

Lock plates in accordance with the invention may be made in various sizes, and the extent of the "squeeze" given to the outer end of the collar will be approximately the same in each instance. However, for 10-32 screws having a screw diameter of .190 inch, the normal internal diameter of the nut before it is squeezed should be about .192 inch. The extent of the squeeze may vary from .010 to .050 inch, in fact it may exceed the value .050 inch without objectionable results since it is found that the resistance to rotation of the screw does not vary a great deal when the squeeze is increased.

Although the plates can be made of a variety of materials, it is found that they are particularly satisfactory when constructed from stainless steel which has a desirable elasticity and is substantially free from corrosion in service.

It is found that the resistance to rotation of a screw in a nut plate of the type described remains substantially uniform in service, neither increasing nor decreasing, and this is true even after the plates have been exposed to high temperatures such as are encountered in exhaust structures for aeroplane engines.

In addition to its other advantages, the construction described is of relatively light weight as compared with other lock nut structures. It also has low overall height permitting its use in inaccessible places. Furthermore, the threaded portion of the nut plate is relatively close to the object to which the plate is attached, permitting the use of screws of minimum length, thereby saving weight which is particularly important in aircraft construction.

Various departures from the exact construction shown and described can be made without departing from the invention which is limited only to the extent set forth in the appended claims.

I claim:

1. An anchor nut for projection-welded connection to a metal body, said nut comprising a body portion having a threaded bore for the reception of a threaded securing member to be held by the nut, an anchoring flange projecting laterally from the base of the body portion of the nut, said flange having a first indentation in its outer face, and a welding projection on its inner face, formed by material projected from the inner face by the formation of said first indentation, said first indentation being too shallow relative to its width to function as a drill-centering recess, and a second indentation within said first indentation and centered with respect thereto, said second indentation being of sufficiently small area relative to said first indentation to accurately locate the center thereof and being of such depth as to remain after the welding operation.

2. An anchor nut for projection-welded connection to a metal body, said nut comprising a body portion having a threaded bore for the reception of a threaded securing member to be held by the nut, an anchoring flange projecting laterally from the base of the body portion of the nut, and securing means for the welded attachment of said nut to the surface of said metal body, comprising a projection of small area on the under surface of said flange, said projection being adapted to be fused by projection welding when the nut is attached to said surface to provide a projection-welded area capable of ready removal by a drill, and a drill-locating indentation in the top face of said flange in alignment with said projection for locating a weld-removing drill, said drill locating indentation being of sufficiently small area relative to the area of said projection to accurately locate the center thereof and being of such depth as to remain after the welding operation.

RUSSELL C. HUNTOON.